W. S. HAYNES.
ANTISWITCHING DEVICE.
APPLICATION FILED NOV. 6, 1915.

1,236,432. Patented Aug. 14, 1917.

INVENTOR
Warren S. Haynes
BY
Mitchell, Chadwick & Kent
ATTYS.

UNITED STATES PATENT OFFICE.

WARREN S. HAYNES, OF MARSHALLTOWN, IOWA, ASSIGNOR OF ONE-HALF TO JOHN O. HAYNES, OF GARWIN, IOWA.

ANTISWITCHING DEVICE.

1,236,432.   Specification of Letters Patent.   Patented Aug. 14, 1917.

Application filed November 6, 1915. Serial No. 60,108.

*To all whom it may concern:*

Be it known that I, WARREN S. HAYNES, a citizen of the United States, residing at Marshalltown, in the county of Marshall and State of Iowa, have invented new and useful Improvements in Antiswitching Devices, of which the following is a specification.

This invention relates to improvements in devices for preventing the switching of a cow's tail. More particularly it relates to devices applicable to the tail which, while not preventing the cow from moving the tail, do prevent the tail from moving in the characteristic manner which is so annoying and upsetting to a person milking the cow.

In the accompanying drawings, which illustrate one embodiment of the invention:

Figure 1:
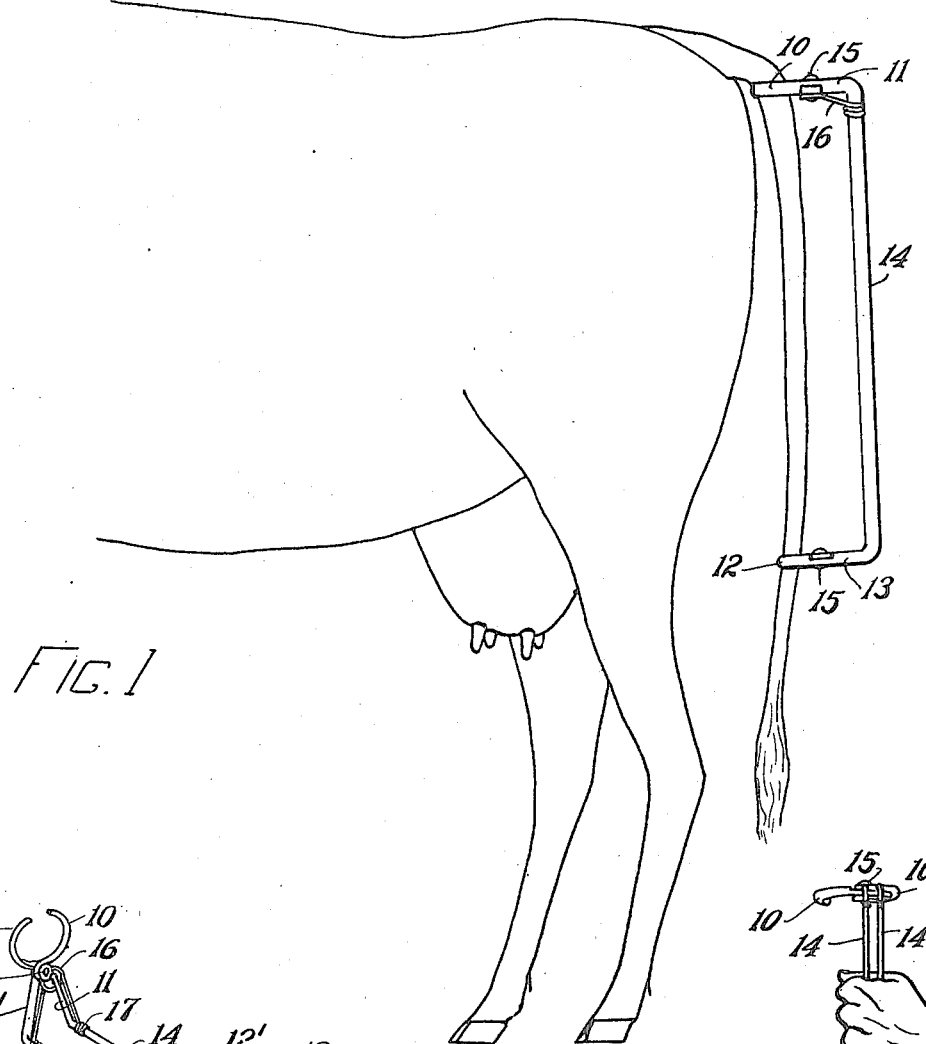
Figure 1 shows the device as applied to the tail of a cow.
Figure 2:
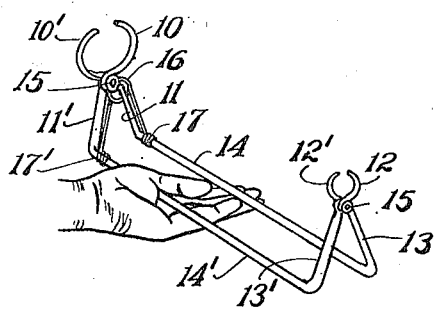
Fig. 2 is a perspective showing the device removed.

Referring to the drawings and particularly to Fig. 2 the device is seen to consist chiefly of two elements, one of which has a large claw 10 and a handle 11, a small claw 12 and a handle 13, and a bar 14 connecting the two handles 11 and 13. All of these parts 10, 11, 14, 13, 12, are preferably made from a single piece of material such as a rod of iron, by bending and shaping the same suitably. The coöperating element is similar to this and in the drawing the corresponding parts are similarly marked 10', 11', 14', 13', 12'. These are put together and held by two pivots 15, which penetrate one element between its claw 10 and handle 11 or claw 12 and handle 13, and penetrate the other element correspondingly. Thus each claw and handle constitute a lever whose fulcrum is at 15. The parts are put together so that when the handles 14, 14' are drawn together swinging about the pivots 15 as fulcrums, they separate the claws 10 from 10' and 12 from 12'.

A spring 16, which may be a simple piece of spring wire of suitable stiffness and suitably coiled, is attached by the coil 17 to the handle 14 and by a similar coil 17' to the handle 14' with an intervening V-formation and coiled at the apex of the V. The tension of this spring is such that it tends to throw the handle bars 14, 14' apart from each other. This completes the apparatus.

Figure 3:
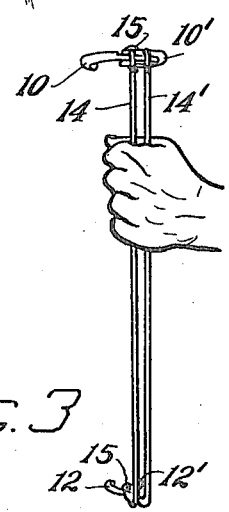
Fig. 3 is a perspective showing the device removed, but in its open position, as operated by one hand ready to be applied to the tail.

When assembled the apparatus automatically closes its jaws 10, 10' and 12, 12' by action of the spring; but both jaws may be opened simultaneously by one hand of a person who grasps either pair of handles 11, 11'; 13, 13'; or preferably the handle bars 14, 14', joining them as illustrated in Fig. 3. After being placed on the cow's tail, a relaxation of the grip allows the spring to close the jaws 10, 10'; 12, 12'; upon the tail. Because of the integral connection between the part 10 and the parts 12, and that between the parts 10' and 12', any looseness in the fit of either pivot 15 is not sufficient to permit a twisting of the other member of that pair of levers with respect to the axis. This is because the connected members are at a distance from each other; and such twisting cannot occur without rotation of its integrally connected part about the same center, which rotation if it were to occur would be much multiplied in extent because of its greater distance from that center but which cannot occur because that member is in turn engaged by its pivot 15 with the other element. On account of the rigidity with which the handle members hold the clamping members in their proper planes, a single spring is sufficient; and the combination has a rigidity of effect, notwithstanding there may be some lack of precision in the fit of parts to each other, which makes the apparatus particularly effective in use. Variations from the specific apparatus illustrated may be made without departing from the scope of the invention as expressed in the following claims.

A different style of spring may be employed if preferred and the apparatus may be varied in other respects without departing from the scope of the invention, as expressed in the following claims.

I claim as my invention:

1. An anti-switching device for cows' tails, comprising mechanical means to grasp frictionally and without penetration a tail at two widely separated points without intervening contact of the tail with the grasping means; and means to hold said grasping means spaced at their fixed distances from each other, whereby the curving of a tail incidental to switching is prevented; the said grasping means constituting narrow bladed pincers; and the said spacing means comprising rigid connections each extending from the handle portion of a lever of one of the sets of pincers to the handle portion of one of the levers of the other set of pincers.

2. An anti-switching device for cows' tails comprising two elements pivoted together, each of said elements comprising a U-shaped piece formed at its ends to partially surround a tail in manner to embrace without penetrating it; pivots joining the end portions of the U's, and a spring tending to maintain the embrace; the middle portions of the U being long enough to extend past a multiplicity of vertebræ of the tail of a cow.

Signed by me at Marshalltown, Iowa, this third day of November, 1915.

WARREN S. HAYNES.